Patented Mar. 28, 1950

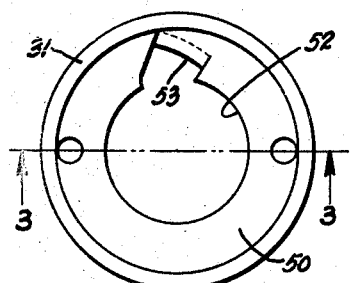
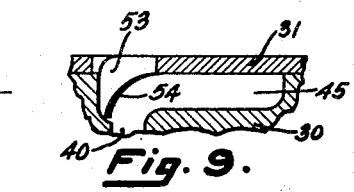
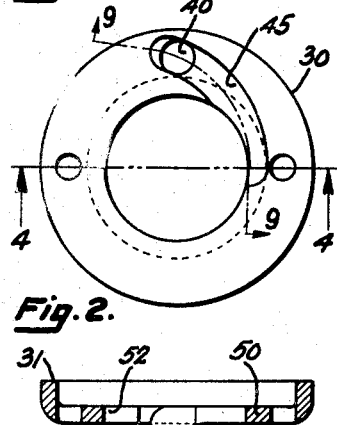
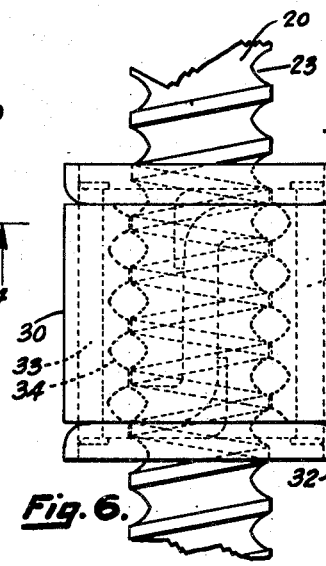
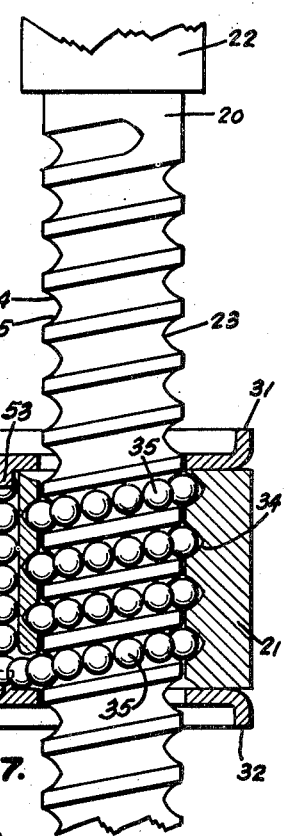
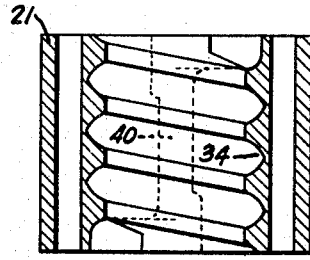
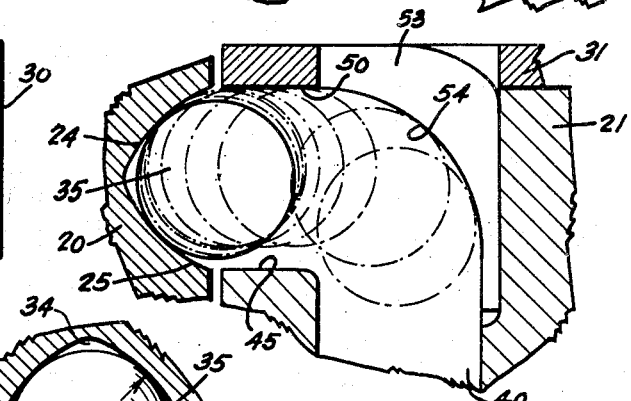
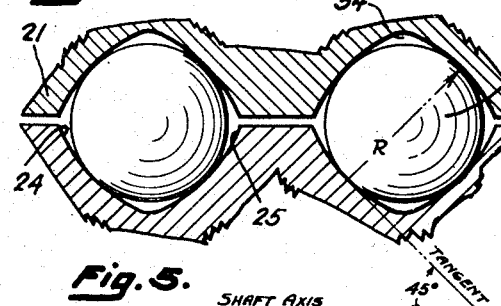

2,502,066

UNITED STATES PATENT OFFICE 2,502,066

BALL-BEARING SCREW AND NUT

Samuel Beaty Tanner, Dayton, Ohio, assignor to General Motors Corporation, Detroit, Mich., a corporation of Delaware Application January 17, 1947, Serial No. 722,620

5 Claims. (Cl. 74—459)

1

This invention relates to improvements in anti-friction screw devices.

It is among the objects of the present invention to provide improved wear reducing means for recirculating ball bearings within the confines of the nut of a screw device in which the nut and cooperating screw shaft provide complemental grooves forming a helical groove in which interengaging ball bearings connect the nut and shaft for transmitting force from one to the other.

A further object of the present invention is to provide the nut of a screw device with means which cooperates with the helical groove of a screw shaft to form a closed, continuous path for the ball bearings mechanically connecting the nut and shaft for power transmission, the character of said means being such that the bearings are automatically directed through said path in a manner to reduce resistance and wear to a minimum and practically eliminate the possibility of jamming of the bearings as they are circulated through said closed path.

A still further object of the present invention resides in the provision of a smooth operating anti-friction screw and nut device of the recirculating ball type in which simplified design and rigid construction reduce material and production costs to a minimum and in which the hazards of wear and the possibility of jamming are substantially eliminated.

Further objects and advantages of the present invention will be apparent from the following description, reference being had to the accompanying drawing, wherein a preferred embodiment of the present invention is clearly shown.

In the drawing:

Fig. 1 is a plan view of the ring-shaped end plate to be attached to each end of the nut of the screw device.

Fig. 2 is an end view of the nut with end plate removed.

Fig. 3 is a section of the plate shown in Fig. 1 and taken along the line 3—3 of Fig. 1.

Fig. 4 is a section of the nut taken along the line 4—4 of Fig. 2.

Fig. 5 is a fragmentary section, at enlarged scale, of the nut and screw shaft, illustrating particularly the shape of the complemental grooves therein.

Fig. 6 is a side view of a complete nut on a fragment of a screw shaft.

Fig. 7 is a part sectional and part elevational assembly view of a nut and shaft.

Fig. 8 is a diagrammatic, enlarged view illustrating the path of travel of a ball bearing leaving the screw shaft groove and entering the recirculating path in the nut.

Fig. 9 is a fragmentary, sectional view taken along the line 9—9 of Fig. 2, illustrating the spiral, diverging groove in the nut, with the addition of the end retainer plate.

The anti-friction, recirculating ball bearing type screw device comprises a screw shaft 20 mechanically connected to a nut 21 so that rotation of the screw shaft causes the nut to move axially thereon. The shaft 20 comprises an end 22 adapted to be attached to any suitable driving mechanism, and a shank provided with a continuous helical groove 23. The ordinary groove having a semi-circular cross section conforming to the contour of the ball bearing running therein would not provide the desired action which, as will later be described, is one of the features of the present invention. To obtain this feature action, the screw shaft of the present invention has a continuous, helical groove 23 which is lancet arch shaped as shown in the Figs. 5 to 8 inclusive where the two opposite walls 24 and 25 are so shaped that they meet, to form the bottom of the groove, at a point outside the spherical confines of the ball bearings in said groove. A satisfactory curvature of the surface of one half side of the groove as designated by the numerals 24 or 25, is described by a radius R predeterminately in excess of the diameter of the ball bearing and located at the point of contact with the surface of the ball by a plane tangent to the ball and at 45° to the axis of the shaft. This is clearly illustrated in the Fig. 5.

The nut 21 which encircles the shaft 20 and is adapted to move axially thereon is shown constructed of three portions, namely the body portion 30 and two end, retainer plates 31 and 32, secured to the respective ends of the nut body 30 by rivets 33. The central, longitudinal hole in the nut body 30 slidably fits over the screw shaft 20. The peripheral surface of said hole is provided with a spiral groove 34 complemental to the groove 23 in the shaft 20 so that the grooves of both shaft and nut coincide to provide a helical channel between said two parts through which a series of ball bearings 35 are adapted to circulate. These ball bearings 35 mechanically connect the shaft and nut so that forces are transmitted one to the other, particularly from the rotating shaft 20 to the non-rotatable nut 21 to cause the latter to move longitudinally on the shaft.

A longitudinal duct 40 extends from end to end of the nut body 30 and is large enough in transverse dimension to pass the ball bearings 35. Each end of duct 40 is in communication with the helical passage formed by the complemental grooves of the shaft and nut, thereby providing for the recirculation of the interengaging balls within the confines of the nut 21. The means for providing this communication between the duct ends and the helical passage is an arcuate, diverging groove 45 provided in each end of the nut body 30, one end of said groove 45 communicating with the duct 40, the spiral curvature of the groove 45 being such that its opposite end merges with the helical groove 34 in the nut body substantially tangentially. Groove 45 is substantially spiral, leading from the helical groove to the longitudinal groove. See Figs. 2 and 9. The present drawing (see Figs. 2 and 4), show this groove 45 cut in the nut block or body 30, however, to facilitate production, separate ring portions, providing only the diverging groove 45 may be separately produced and then attached to the respective ends of the nut body to provide the same structure.

The ring shaped end retainer plates 31 and 32 are substantially identical. They comprise a ring shaped, flat disc or plate 50. The central opening 52 therein is substantially the same diameter as the central opening in the nut body 30 so that the screw shaft 20 may freely pass therethrough. The plates 31 and 32 each have a finger 53, which, when the plate is placed in position on its respective nut end, projects into the adjacent end of the duct 40. Each finger is so disposed so that an arcuate edge 54 thereof provides a guide surface facilitating the smooth passage of the ball bearings during their recirculation between the helical passage and the duct 40. Securing plates 31 and 32 to the respective ends of the nut body 30 causes their flat body portions 50 to form a confining wall for the open diverging spiral groove 45 at the ends of the nut body 30, against which the ball bearings may impinge as they are pushed toward the ends of the nut during circulation as the shaft rotates relatively to the nut.

From the aforegoing description and with a view particularly to Fig. 7, it may readily be understood that as the shaft is rotated in one direction relatively to the nut 21, the balls 35 are moved upwardly (Fig. 7) through the helical passage formed by the grooves in the shaft and nut, through the spiral, diverging groove 45, and recirculated through duct 40, all circulation of the balls taking place within the confines of the nut itself. In structures of this character, circulating and recirculating balls within the confines of the nut itself is not fundamentally new, however, the features of the present invention which reduce friction and wear to a minimum and facilitate the smooth passage of the balls through the recirculating path are not embodied in the known devices. These features comprise the lancet arch shape of the helical groove in the shaft and the particular spiral curvature of the diverging groove 45 relatively to the helical passage between the nut and shaft with which said diverging groove merges, plus the provision of the guiding fingers extending into the recirculating duct and having a curved, guiding surface which leads the ball bearings smoothly from the diverging groove into the duct at one end of the nut and from the duct into the diverging groove at the opposite end of the nut.

At comparatively slow rotation of the screw shaft in the one direction, the balls 35 moving upwardly in the helical passage (Fig. 7) will eventually impinge against the flat plate portion 50 which together with the wedging action of the lancet shaped shaft groove urges the balls outwardly into the spiral, diverging groove 45, the plate 31, as has been mentioned heretofore, forming one confining wall for this groove. As the balls continue along the diverging groove toward the duct 40, they will strike the curved guide surface 54 of the finger 53 and smoothly round the bend to enter the duct 40. However, as the rotative speed of the shaft 20 increases the pushing effect of the string of balls together with the camming action of the lancet shaped groove in the shaft will thrust or, if an analogical expression be permitted, actually "squirt" the balls from the helical passage into the merging diverging groove, the particular spiral curvature of which offers the least resistance to the passage of the balls from the helical passage to the duct 40. Under these circumstances the balls will scarcely, if at all, contact the end plates, thereby substantially reducing wear and practically eliminating jamming, especially at high speeds.

While the embodiment of the present invention as herein disclosed, constitutes a preferred form, it is to be understood that other forms might be adopted, all coming within the scope of the claims which follow.

What is claimed is as follows:

1. In a device of the character described, the combination with a shaft having a continuous helical groove lancet arch shaped in cross section; of a nut longitudinally movable on said shaft, the interior, annular wall of the nut having a helical groove corresponding in pitch, size and shape to the groove in the shaft; a duct in said nut extending from end to end therein and substantially parallel to the shaft; a diverging groove in each end of the nut, said groove being spiral relatively to the axis of the shaft and communicating with the duct and merging with the helical groove at the respective end of the nut; a flat ring plate secured at each end of the nut and forming a flat, confining wall of the adjacent diverging groove in the nut; a finger integral with and extending from each plate directly into the duct, each finger providing an arcuate guiding edge; and interengaging balls in the space provided by the complemental shaft and nut grooves and in the diverging grooves and duct.

2. In a device of the character described, the combination with a shaft having a continuous helical groove in its peripheral wall surface; of a nut longitudinally movable on the shaft, the inner wall of the nut having a helical groove corresponding to the shaft groove to form a helical channel between the nut and shaft; a duct in the nut extending from one end to the other; a diverging groove at each end of the nut, said groove being spiral relatively to the axis of the shaft, one end of the diverging groove communicating with the duct, the other merging with the helical groove in the nut; a ring plate secured to each end of the nut and forming a flat, confining wall for the diverging groove; a finger integral with and extending from each plate directly into the duct, each finger providing an arcuate deflector, one end of which merges with the interior surface of the plate, the other with the inner wall of the duct; and balls in the helical channel, diverging grooves and the duct.

3. In a device of the character described, the combination with a shaft, the outer peripheral surface of which has a continuous helical groove lancet arch shaped in cross section; of a nut longitudinally movable on said shaft, the interior annular wall of which has a continuous helical groove corresponding in pitch, size and shape to the groove in the shaft; a duct extending from one end of the nut to the other and substantially parallel to the shaft; a diverging groove in each end of the nut spirally formed relatively to the axis of the nut and connecting the helical groove of the nut with respective ends of the duct so that the ends thereof, merging with the helical groove in the nut, is substantially tangential therewith; an abutment ring plate secured to each end of the nut and forming a confining wall for the diverging groove; a finger integral with and extending from each plate directly into the respective ends of the duct and having an arcuate surface providing a guide wall between the diverging groove and the duct; and balls in the channel formed by the nut and shaft grooves, the diverging groove and the duct, the contour of the shaft groove urging the balls outwardly through the diverging groove and toward the duct as they are circulated by shaft rotation relatively to the nut.

4. An anti-friction screw mechanism comprising a screw shaft formed with a continuous helical groove; a cooperating nut movable longitudinally on said shaft and having a groove complemental to said screw shaft groove to form a helical passage between the shaft and nut; interengaged balls in said passage for transmitting force from the shaft to the nut; a longitudinal duct in the nut from end to end thereof; a diverging groove in each end of the nut, said diverging groove being arcuated spirally relatively to the axis of the nut so that one end merges tangentially with the helical groove, the other end communicating with a respective end of the duct; and a baffle ring plate at each end of the nut, forming a flat confining wall for the diverging groove adjacent thereto, said ring plate each having an integral, wedge-shaped finger extending directly into a respective duct for guiding the balls between the duct and diverging groove.

5. An anti-friction screw mechanism comprising a rotatable screw shaft formed with a helical groove lancet arch shaped in cross section; a cooperating nut encircling said shaft and provided with a helical groove complemental to the groove in the shaft and movable only axially thereon; a plurality of interengaging balls between the shaft and nut in the grooves thereof for transmitting axial force from the shaft to the nut; a longitudinal duct in the nut extending from end to end thereof; a diverging spiral groove in each end of the nut, one end of each groove communicating with a respective end of the duct, each groove being spirally arcuated relatively to the axis of the nut so that its other end merges tangentially with the arched groove in the nut to form a gradual, outwardly extending path for the balls from the grooves between the nut and shaft to the adjacent duct as they are urged radially outwardly while the balls are being circulated during shaft rotation; a flat ring plate attached to each end of the nut and forming a confining wall of the diverging groove in the nut; and a finger integral with and extending from each plate directly into the adjacent duct end, each finger having an arcuate guide surface facilitating the passage of the balls from the diverging groove into the duct at one end and from the duct into the diverging groove at the other end of the nut.

SAMUEL BEATY TANNER.

REFERENCES CITED

The following references are of record in the file of this patent:

UNITED STATES PATENTS

| Number | Name | Date |
|---|---|---|
| 477,642 | Brunthaver | June 28, 1892 |
| 1,565,805 | Jones | Dec. 15, 1925 |
| 2,091,268 | Colman | Aug. 31, 1937 |

FOREIGN PATENTS

| Number | Country | Date |
|---|---|---|
| 30,214 | Great Britain | Dec. 24, 1909 |